(12) United States Patent
Wright et al.

(10) Patent No.: US 6,719,165 B2
(45) Date of Patent: Apr. 13, 2004

(54) APPARATUS AND METHOD FOR REINFORCING A PRESSURE VESSEL

(75) Inventors: Roger D. Wright, Logan, UT (US); Marcus A. Darais, Brigham City, UT (US); James A. Yorgason, South Ogden, UT (US); Alan J. Loveless, Brigham City, UT (US); Darrel G. Turner, Perry, UT (US); David R. Nelson, Logan, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/938,327

(22) Filed: Aug. 22, 2001

(65) Prior Publication Data

US 2003/0019874 A1 Jan. 30, 2003

Related U.S. Application Data

(60) Provisional application No. 60/227,176, filed on Aug. 22, 2000.

(51) Int. Cl.$^7$ .............................................. B65D 90/02
(52) U.S. Cl. ........................ 220/586; 220/4.13; 220/562
(58) Field of Search ................................. 220/581, 584, 220/586, 592, 4.12, 4.13, 4.14, 4.04, 4.05, 4.06, 565, 562, 567.1, 588, 589, 590

(56) References Cited

U.S. PATENT DOCUMENTS

| | | | | |
|---|---|---|---|---|
| 3,372,075 A | * | 3/1968 | Holt et al. | 156/172 |
| 3,490,638 A | * | 1/1970 | Elliott et al. | 220/565 |
| 3,608,767 A | * | 9/1971 | Elliott et al. | 220/4.12 |
| 4,118,262 A | | 10/1978 | Abbott | |
| 4,614,279 A | * | 9/1986 | Toth et al. | 220/590 |
| 5,348,603 A | | 9/1994 | Yorgason | |
| 5,593,770 A | | 1/1997 | Mumford et al. | |
| 5,653,358 A | * | 8/1997 | Sneddon | 220/590 |

* cited by examiner

Primary Examiner—Stephen Castellano
(74) Attorney, Agent, or Firm—TraskBritt

(57) ABSTRACT

Pressure vessel end dome reinforcements are placed upon resin-impregnated fiber-wound pressure vessels to improve the strength-to-weight ratio of high performance pressure vessels, such as those that are used as rocket motors, gas generators, and the like. The reinforcement structures are assembled from gore pieces to form gore bodies over dome regions of the pressure vessels.

10 Claims, 5 Drawing Sheets

APPARATUS AND METHOD FOR REINFORCING A PRESSURE VESSEL

CROSS-REFERENCE TO RELATED APPLICATION

This application claims the benefit of priority of U.S. Provisional Application Ser. No. 60/227,176 filed in the U.S. Patent & Trademark Office on Aug. 22, 2000, the disclosure of which is incorporated herein by reference.

GOVERNMENT LICENSE RIGHTS

The U.S. Government has a paid-up license in this invention and the right in limited circumstances to require the patent owner to license others on reasonable terms as provided for by the terms of contract no. OF4611-97-C-0053 awarded by the U.S. Air Force.

BACKGROUND OF THE INVENTION

1. Field of the Invention

The present invention relates to pressure vessels and, more specifically, to apparatus and methods for reinforcing pressure vessels. Examples of such pressure vessels include rocket motors, gas generators, and the like.

1. Description of the Related Art

It is desirable in the design and construction of certain pressure vessels, for example, high performance pressure vessels for rocketry or gas generator applications, to effectively reduce or minimize the inert mass of the vessel while maintaining or enhancing its strength and reliability. It also has been desirable to do so while containing or reducing the cost of such vessels.

Many pressure vessel designs include one or more doubly curved surfaces, for example, such as those associated with integrally formed end domes. These doubly curved surfaces may assume a number of different specific geometries or geometric cross sections. Pressure vessels used as motor casings for rocket motors, for example, typically include a cylindrical section, a domed fore section or domed fore and aft sections, and a doubly curved transition or mating section disposed between the cylindrical section and the domed section or sections. Other vessel designs also include such doubly curved surfaces, for example, such as spheres, ellipsoids, and the like.

It is generally desirable in pressure vessel design to address weak points in the vessel structure so that the vessel has a predictable, consistent, repeatable failure mode and location. By predetermining this failure mode and location, the designer may ensure that the vessel is constructed such that the operating demand of the vessel will not exceed its strength at this weakest point. In a cylindrical vessel with end domes, for example, the desired failure location often preferably is in the cylindrical section. In more weight-optimized high performance vessels, the failure location may tend to move into the end dome region, for example, due to the stress peaking from bending.

In many applications, the doubly curved surface is the area, or an area, of the vessel that is most prone to mechanical failure. This can occur for a number of reasons. As a vessel, e.g., a rocket motor, is pressurized, it experiences a number of internal stresses. One such stress is attributable to the outward force exerted from the pressurized fluid in the interior of the vessel. Depending upon the application, another such stress may be the bending moments that are exerted, particularly at the doubly curved surface, associated with relatively opposed or noncooperating forces exerted on the components of the vessel. The stress peak may be especially severe at the junction between the doubly curved surface and a nondoubly curved surface, for example, such as the junction between a hemispherical end dome and a cylindrical wall. The vessel design ideally is such that it can accommodate these bending stresses at their peaks.

Pressure vessels may be made in a number of different ways. A typical manufacturing technique used to produce solid fuel rocket motors, for example, as described in U.S. Pat. No. 4,118,262, involves the use of helically wound fiber-based composites. A material made of a high strength, continuous reinforcing filament, such as graphite or aramid fiber, for example, is impregnated with a compatible resin for hardening. The filament is wound around a mandrel, the resin is set or hardened, and the mandrel is withdrawn from the casing. The fibrous material is stabilized on the mandrel by winding around pegs in the mandrel that define holes in the fibrous material. The angle between the axis of the fiber and the longitudinal axis of the casing typically is kept as small as possible to cause forces applied to the fibers to be substantially longitudinal tensile forces. The motor shell is subsequently filled with an insulating layer, a binding layer, and a solid fuel. The filament may be woven into strips or deposited as tow. According to U.S. Pat. No. 5,348,603 to Yorgasen, for example, similar manufacturing processes may be used to wind a motor casing that is inserted into a metal shell and expanded through use of a bladder in the mandrel prior to hardening of the resin. The casing adheres to the inside of the metal shell.

In view of the design approaches used in constructing pressure vessels and the tendency for mechanical failure associated with the doubly curved surface in high performance lightweight vessel applications, it is often desirable to strengthen this doubly curved surface. One approach to providing such added strength is to reinforce that portion of the vessel by applying a reinforcing structure or material at the exterior of the vessel. A reinforcing structure, for example, may be placed over the doubly curved surface and end dome. To provide a specific example, a filament-wound helical layer could be placed over the doubly curved surface, e.g., over the end dome and transition section of a cylindrical vessel with dome, to serve as a reinforcing structure. These reinforcing structures normally would be placed upon a pressure vessel after the initial vessel has been formed, e.g., by helical winding on the mandrel. The portion or portions of the reinforcing structure that are not required for vessel reinforcement then can be removed to limit the added weight penalties created by this approach.

This approach is generally limited or disadvantageous, for example, in that it tends to be labor intensive. It also can add unnecessarily to the cost of the reinforced vessel, for example, in that the reinforcing material, which often involves considerable expense, typically is discarded and cannot readily be reused. This approach also can be limited or disadvantageous, for example, in that, as noted above, the weight of the vessel often is increased unnecessarily, especially where filament winding is used as the reinforcing material. Filament winding also can result in increased thickness at or around the polar openings of the vessel, where present, for cylindrical vessels.

BRIEF SUMMARY OF THE INVENTION

Accordingly, the present invention provides a pressure vessel and related apparatus and methods wherein the pressure vessel can withstand relatively high stresses relative to its mass.

The present invention also provides a pressure vessel and related apparatus and methods that achieve the foregoing with relative cost effectiveness.

A pressure vessel and associated methodology are provided to achieve the foregoing in accordance with the purposes of the invention as embodied and broadly described in this document.

The vessel includes a vessel body having a doubly curved surface disposed about a vessel body axis. A reinforcing structure is disposed at the doubly curved surface of the vessel body about the vessel body axis. The reinforcing structure comprises a plurality of gore pieces disposed on the vessel body at the doubly curved surface to form a gore body. Each of the gore pieces comprises a composite sheet having a shape that conforms to the doubly curved surface. The gore pieces are disposed on the doubly curved surface in overlapping relation.

Each of the gore pieces preferably comprises a fiber-resin preimpregnated (also referred to as "prepreg") composite material. The resin serves as a bonding material that bonds the gore pieces to one another. Each of the gore pieces preferably has a longitudinal dimension and comprises fibers oriented in a plus/minus configuration relative to the longitudinal dimension. The fibers in the plus/minus configuration of each of the gore pieces are preferably oriented at a fiber angle of between about 30° and 60°, and more preferably about 45°, with respect to the gore piece longitudinal axis. The gore pieces are any sheet or partial sheet of material that tapers in a direction, such as a triangular, truncated triangular or rhombic shape, and these are preferably assembled in overlapping relationship to one another as a single layer in a flattened "Z" configuration or multiple layers where the gore pieces of each layer abut at their meridional edges. Where there are multiple layers, additional fiber or tow may be wound to separate each layer or, alternatively, the layers are adjacent and contact one another. In any manner of placement, it is preferred that the gore pieces overlap one another by about 40 to 60%, and most preferably by about 50%, to provide the gore body with a substantially uniform thickness.

The vessel has an axis of symmetry and each of the gore pieces also has an axis of symmetry. The longitudinal axis of each gore piece curves, but an individual gore piece may be rotated for viewing as a straight line. From this perspective, in some embodiments, it is preferred to have the gore piece longitudinal axis aligned with the axis of symmetry of the vessel. In other embodiments, especially where the gore pieces may be placed by machine, it is expedient, due to machine winding techniques, to preferably offset the gore piece longitudinal axis with respect to the vessel axis of symmetry. In this latter case, the offset angle is preferably less than or equal to about plus or minus 20° and is more preferably between plus or minus 15°. A more preferred orientation of the gore piece deviates from the axis of symmetry by no more than 10°, a deviation of 5° or less is most preferred, and a deviation of 0° is most preferred.

In another embodiment, the vessel-reinforcing structure may be assembled independently of the pressure vessel itself for later assembly and coupling with the vessel. In the intended environment of use, the pressure vessel has a doubly curved surface and presents a vessel body axis about which the doubly curved surface may be formed. As described above, the vessel-reinforcing structure comprises a plurality of gore pieces that are shaped to conform to the doubly curved surface of the vessel body about the vessel body longitudinal axis and to form a gore body. Each of the gore pieces comprises a composite sheet and is bound with resin in the assembled vessel-reinforcing structure.

Another embodiment relates to a method for making a reinforcing structure for a vessel having a vessel body with a doubly curved surface. The method steps entail making a plurality of gore pieces for disposition on the vessel body at the doubly curved surface about the vessel body axis to form a gore body. The gore pieces are each disposed as a composite sheet. The gore pieces each have a longitudinal dimension and comprise fibers oriented in a plus/minus configuration relative to the gore piece longitudinal dimension.

Preferred aspects of the method include orienting the fibers in the plus/minus configuration of each of the gore pieces at a fiber angle of between about 30° and 60° with respect to the gore piece longitudinal axis, and the most preferred orientation is 45°. The gore pieces are preferably formed in a substantially triangular or rhombic shape. A bonding material, such as a synthetic resin, is placed on each of the gore pieces, which are assembled in overlapping relation to one another.

The gore pieces can be assembled by a variety of techniques to place them in overlapping relation to one another. According to one method of disposition, which is most preferred, first layer gore pieces substantially abut one another at their respective meridional edges around the doubly curved surface, and second layer gore pieces are disposed over the first layer gore pieces and around the doubly curved surface so that each of the second layer gore pieces overlaps at least two of the first layer gore pieces by about 40 to 60%. The most preferred extent of overlap is about 50%. An alternative method of overlapping the gore pieces is to assemble them as a single layer where the adjacent pieces overlap one another in a flattened "Z" configuration. The extent of overlap between adjacent pieces is preferably from 40 to 60%, and is more preferably about 50%. Either method of disposition preferably results in the gore body having a substantially uniform thickness.

Another aspect of this method of making the vessel-reinforcing structure is to assemble the vessel-reinforcing structure apart from the pressure vessel, as opposed to assembly on the vessel. The gore body may be assembled using the gore pieces and resin, and the assembly may be placed on a pressure vessel prior to hardening of the resin. Alternatively, the resin may be allowed to harden and may be adhered to the pressure vessel using additional resin at the time of assembly.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

DETAILED DESCRIPTION OF THE PREFERRED EMBODIMENTS AND METHODS

Figure 1:
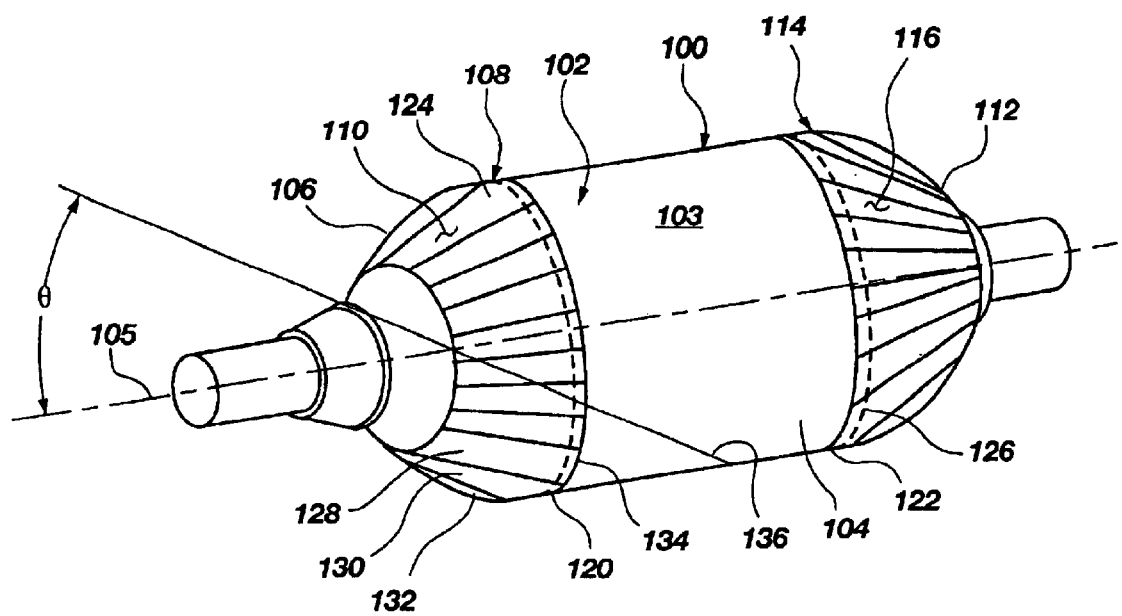
FIG. 1 shows a perspective elevational view of a vessel according to a presently preferred embodiment of one aspect of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification and appropriate equivalents.

In accordance with one aspect of the invention, a vessel is provided that includes a vessel body having a doubly curved surface. The vessel body is disposed about a vessel body axis. The vessel according to this aspect of the invention may take a number of forms. It may, for example, comprise a substantially cylindrical apparatus with a domed end at one or both longitudinal ends of the cylinder, with a doubly curved surface disposed between the cylinder and the domed end to provide a transition from the cylinder to the dome end and to mate the two. The vessel also may comprise a spherical body, or other shape.

Figure 2:
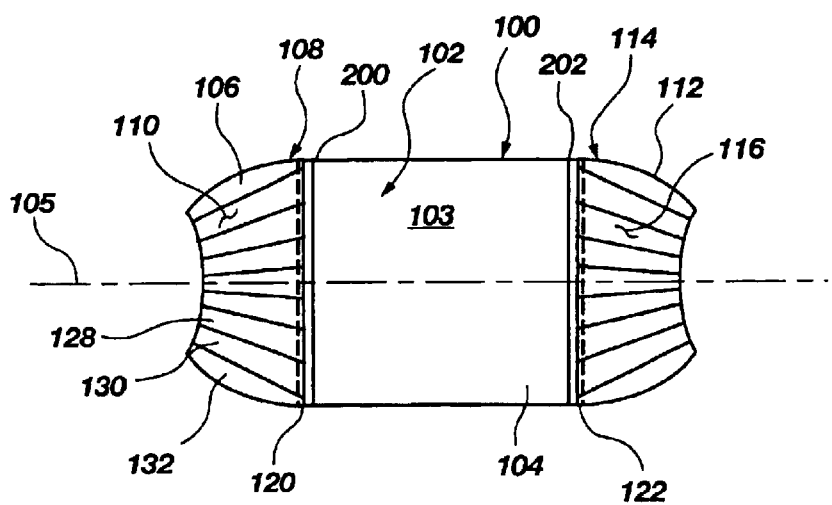
FIG. 2 shows a side view of the vessel shown in FIG. 1.
Figure 3:
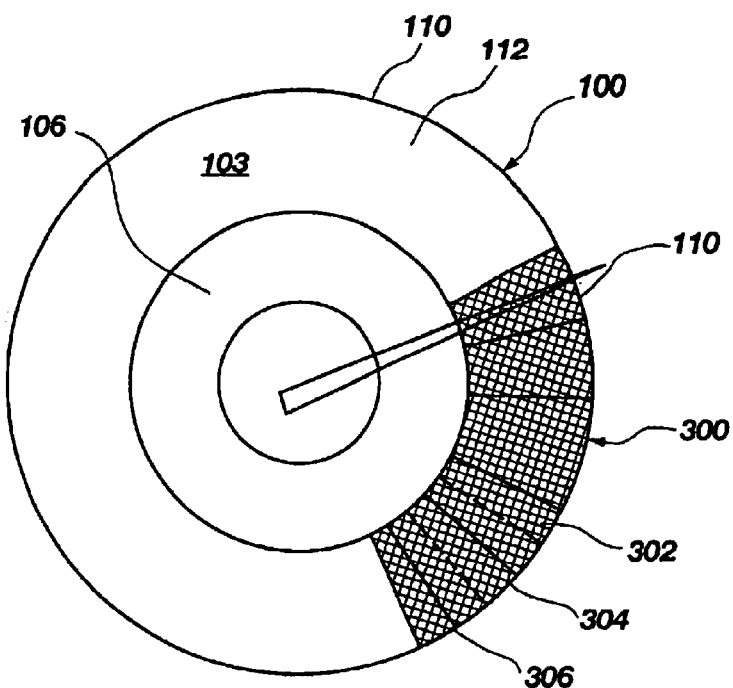
FIG. 3 shows an end view of the vessel shown in FIG. 1 viewed from the forward end and includes a plurality of gore pieces applied to a vessel body.

In accordance with a presently preferred but merely illustrative embodiment of this aspect of the invention, a vessel 100 in the form of a solid fuel rocket motor casing is shown in FIGS. 1–3. Vessel 100 includes a vessel body 102 having an outer surface 103 formed of helically wound tow. Vessel body 102 in turn comprises a cylindrical section 104 symmetrically disposed about a vessel longitudinal axis 105. A domed end section or dome 106 is disposed at a forward end 108 of cylindrical section 104. A doubly curved surface 110 is disposed between cylindrical section 104 and dome 106. In this embodiment, vessel body 102 further includes a domed end section or dome 112 disposed at an aft end 114 of cylindrical section 104, essentially identical to dome 106, and a doubly curved surface 116 disposed between cylindrical section 104 and dome 112. For purposes of illustration, it may be assumed that a cylinder body end plane 120 perpendicular to vessel longitudinal axis 105 lies at the intersection of cylindrical section 104 and doubly curved surface 110 at forward end 108, and a cylinder body end plane 122 perpendicular to vessel longitudinal axis 105 lies at the intersection of cylindrical section 104 and doubly curved surface 116 at aft end 114. The respective domes 106 and 112 extend onto the cylindrical section 104 a sufficient distance to overlap the corresponding areas 124 and 126, which represent the location of peak stress when the vessel 100 is loaded to its design capacity.

Vessel 100, excluding the end domes 106 and 112, is constructed of a filament-wound and resin-impregnated composite material, for example, according to the manufacturing procedures and design information set forth in U.S. Pat. No. 4,118,262 (the '262 Patent"). In contrast to the '262 patent, it is preferred that the filament or tow is helically wound in a conventional manner to impart a longitudinal orientation in the fiber relative to the vessel longitudinal axis 105 such that the angle θ corresponding to the axial orientation of the fibers 136 ranges from 10° to 40°. As is known in the art, the vessel 100 is constructed of many such overlapping layers where successive layers may change the angular orientation of their fibers and preferably differ by 90° from the angular orientation of the prior layer.

Further in accordance with this aspect of the invention, the vessel also includes a reinforcing structure disposed at the doubly curved surface of the vessel body about the vessel body axis. The reinforcing structure according to this aspect of the invention comprises a plurality of gore pieces disposed on the vessel body at the doubly curved surface to form a gore body.

Each of the end domes 106 and 112 is preferably a gore body that is formed of a plurality of assembled gore pieces, such as gore pieces 128, 130, and 132. All of the gore pieces preferably taper towards the vessel longitudinal axis 105. Each dome structure is preferably formed of from twenty to fifty gore pieces, with twenty to thirty gore pieces being most preferred. Each gore piece has a base, e.g., base 134, which most preferably occupies from 5 to 10% of the circumference of vessel body 102.

In accordance with a related aspect of the invention, a method is provided for making a reinforcing structure for a vessel having a vessel body with a doubly curved surface, wherein the vessel body is disposed about a vessel body axis. The method comprises making a plurality of gore pieces for disposition on the vessel body at the doubly curved surface about the vessel body axis to form a gore body. Although this method and the aforementioned preferred embodiment are related, and a preferred version of the method will be described below with regard to the preferred embodiment for ease of illustration, the method is not necessarily limited to that embodiment and may be practiced using alternative structures and approaches.

In the preferred embodiment and method, each of the gore pieces comprises a composite sheet having a shape that conforms to the doubly curved surface. The gore pieces preferably comprise a fiber composite material that is pre-impregnated with resin. Examples of such fibrous materials include carbon graphite fiber, glass fiber, boron filament, and high modulus organic filaments including nylon, polyethylene, PBO, aramid fibers, and other durable fibers. Especially preferred high modulus organic filaments include poly(benzothiazoles) and poly(aromatic azides). Specific examples of commercially available fiber materials include MYKAR and KEVLAR® (a poly(benzamide)) sold by E. I.

DuPont de Nemours & Co. of Wilmington, Del., as well as the carbon fibers including Amoco Performance Product's T40 and Toray's T-800H and T-1000G carbon fibers. The resins are selectively mixed to provide sufficient working time, which may require several days for a completed process.

Suitable resins that are compatible with these fibers are well known in the art. It is especially preferred to utilize a thermally curable resin having a long working life of many hours or even days, such as the chemorheologically tailored matrix resin formulations containing anhydride curing agents as disclosed in U.S. Pat. No. 5,593,770, which is hereby incorporated by reference to the same extent as though disclosed herein. These resins are most preferably epoxy resins based upon diglycidyl ethers of bisphenol A. Other suitable resins include alicyclic diepoxide carboxylate resins, 1,4 butanediol glycidyl ether, polyglycol diepoxide resins, bisphenol F/epichlorhydrin epoxy resins, epichlorhydrin/tetraphenol ethane epoxy resins, and other conventional resins. Reactive curing agents are preferably added to include from 1% to 12% by weight of the total resin as an aliphatic, cycloaliphatic, and aromatic anhydride, such as methyltetrahydrophthalic anhydride, nadic methyl anhydride, methylhexahydrophthalic anhydride, maleic anhydride, and mixtures thereof.

The individual gore pieces may take any of a number of shapes, provided that, when applied to the vessel, they conform to the doubly curved surface. Each of the gore pieces 400, for example, may have a shape that comprises a substantially triangular section, an example of which is shown in FIG. 4, or any other shapes that permit overlapping between successive strips of material in a mutually reinforcing manner over a dome, such as the domes 106 and 112 (see FIG. 1).

Figure 4:
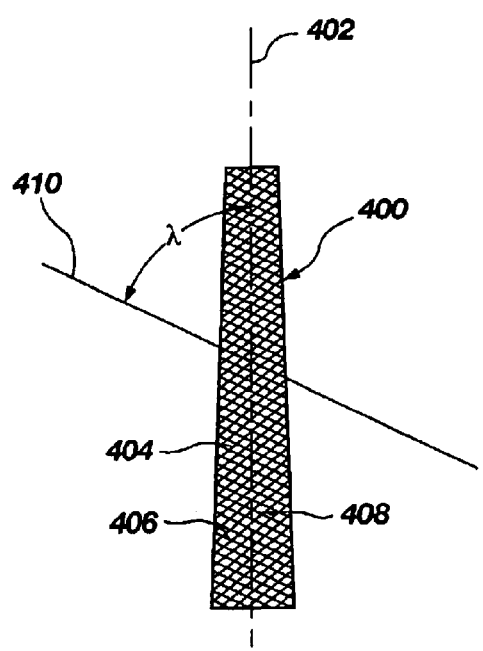
FIG. 4 shows a gore piece according to the preferred embodiment shown in FIG. 1, wherein the gore piece has a triangular shape.

To better illustrate the construction of the gore pieces, as depicted in FIG. 4, each gore piece 400 may be assumed to have a gore piece longitudinal dimension. When the gore piece 400 is spread out in a two-dimensional plane, as shown in FIG. 4, the gore piece longitudinal dimension comprises a longitudinal axis 402 along the gore piece. Because the gore pieces typically are curved in application to conform to the doubly curved surface, the gore piece longitudinal dimension will correspond to the two-dimensional gore piece longitudinal axis but, of course, will be curved according to the shape of the doubly curved surface. Preferably, and in the presently preferred embodiments, the gore piece longitudinal dimension where it intersects or lies closest to the cylinder body end planes 120, 122, is nearly perpendicular to cylinder body end planes 120, 122.

In accordance with the preferred embodiments and methods, each of the gore pieces 400 comprises fibers oriented in a plus/minus configuration relative to the gore piece longitudinal dimension. In addition, again preferably, the fibers (e.g., 404, 406) in the plus/minus configuration of each of the gore pieces are oriented at a fiber angle $\lambda$ of between about 30° and 60° with respect to the gore piece longitudinal axis 402, and more preferably the fiber angle $\lambda$ is about 45°. The plus/minus orientation can permit the gore piece 400 to stretch in two directions, including a first direction that is parallel to vessel longitudinal axis 105 and a second direction that is normal to vessel longitudinal axis 105 without flexing significantly in direct opposition to the fibers forming the helical winding of outer surface 103. This angular offset of the fibers causes them to form small polygons, e.g., polygon 408, which are generally square, rectangular, rhombohedral, etc. in nature. These polygons are deformable under strain in the plus/minus configuration, so long as a tensile loading vector is not aligned in parallel with the fibers, e.g., along filament line 410.

The reinforcing structure, as noted above, comprises a plurality of gore pieces disposed on the vessel body at the doubly curved surface to form a gore body. In accordance with another aspect of the invention, a method is provided for reinforcing a vessel having a vessel body with a doubly curved surface, wherein the vessel body is disposed about a vessel body axis. The method includes disposing a plurality of gore pieces on the vessel body at the doubly curved surface about the vessel body axis to form a gore body. A presently preferred version of this method will now be described with regard to the preferred embodiment of the inventive vessel design, although the method is not necessarily limited to the specific embodiment and approach described hereinbelow.

In the presently preferred embodiments and methods, as shown in FIG. 3, a gore body 300 comprising a plurality of gore pieces 302, 304, 306, each identical to gore piece 400, is provided to cover the doubly curved surfaces 110 and 116. In forming gore body 300 according to the presently preferred embodiments and methods, each of the gore pieces may and preferably does comprise a bonding material, preferably a resin, to bond the gore pieces to one another. The bonding material may be any suitable bonding agent that is compatible with the filaments and suitably bonds them, but which also meets the environmental and operational requirements for the specific application. Examples of suitable bonding materials and filaments are discussed above.

It is desirable that the bonding material is such that, when applied to or provided with the respective gore pieces, the gore pieces have an appropriate level of tackiness with respect to one another so they grip one another and immobilize one another to facilitate construction of the gore body.

In the preferred embodiments and methods, the gore pieces are applied in overlapping relation to form the gore body. A number of approaches for accomplishing this are possible. In one such approach, for example, a plurality of gore piece layers is applied, wherein each gore piece layer is nonoverlapping with itself, but in which all but a top gore piece layer are covered with an overlapping gore piece layer. For example, the gore body in this example comprises a first layer of gore pieces substantially abutting one another around the doubly curved surface and a second layer of gore pieces disposed over the first layer of gore pieces and around the doubly curved surface so that each of the second layer gore pieces overlaps at least two of the first layer gore pieces. Each of the gore pieces includes a meridional edge, and preferably each of the first layer gore pieces is positioned to abut an adjacent one of the first layer gore pieces at the meridional edges. In some applications, it is preferred that each of the second layer gore pieces overlaps the at least two first layer gore pieces by about 40 to 60%, and more preferably by about 50%.

Figure 6:
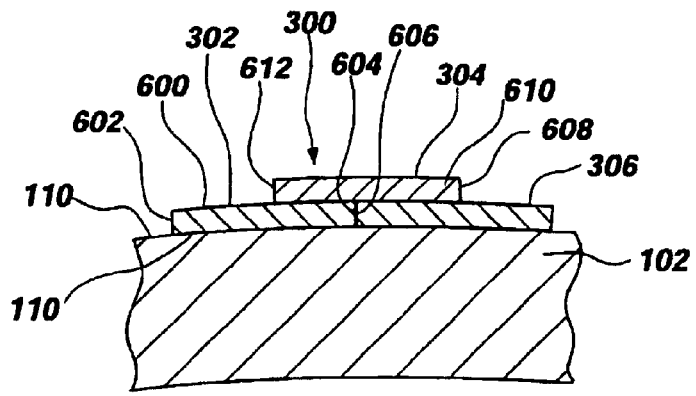
FIG. 6 shows a cutaway longitudinal midsectional view of the vessel shown in FIG. 1 and illustrates a first approach to positioning the gore pieces on the vessel body to make up the gore body.

This approach is illustrated in FIG. 6, which shows a midsectional view of vessel body 102 at doubly curved surface 110, including cross-sectional views of the gore pieces 302, 304, and 306 applied to the vessel body 102 to form a gore body 300 as shown in FIG. 3. A first layer 600 including gore pieces 302 and 304 is disposed on vessel body 102 at doubly curved surface 110. Only two such gore pieces, i.e., pieces 302 and 304, are shown in FIG. 6 for simplicity and ease of illustration. In application, however, first layer 600 would comprise gore pieces such as pieces 302 and 304 extending all of the way around doubly curved surface 110, as shown in FIGS. 1 and 2. Each of the gore pieces includes a pair of meridional edges, which for gore piece 302 are identified as edges 602 and 604 and for gore piece 306 are identified as edges 606 and 608. The first layer gore pieces 302 and 306 in this embodiment are positioned on vessel body 102 so that their meridional edges abut one another as shown in the abutment between edges 604 and 606. All of the gore pieces of first layer 600 preferably are disposed in this fashion. It will be appreciated that the width of the gore pieces (e.g., perpendicular to gore piece longitudinal dimension 402 as shown in FIG. 4) should be selected relative to the diameter of doubly curved surface 110 so that substantially no overlap occurs in the first layer 600.

Continuing with this illustrative approach, a second layer 610 of gore pieces is disposed on the first layer 600 of gore pieces in offset-overlapping relation. Gore piece 304 illustrates the preferred manner in which second gore piece layer 610 is disposed relative to first layer 600. It represents only a single gore piece in this second layer, of course, whereas the second layer in practical application preferably would include gore pieces extending over the entire doubly curved surface 110 and the entire first layer 600 of gore pieces. The gore pieces of second layer 610 preferably are disposed in abutting relation relative to one another, i.e., with their meridional edges (e.g., edge 612) of adjacent gore pieces abutting one another as shown for the first layer 600 at edges 604 and 606. Each gore piece of the second layer, e.g., gore piece 304, is disposed over the first layer gore pieces, e.g., gore pieces 302 and 306, so that it overlaps them. As noted above, this overlap preferably is between about 40 and 60% for each second layer gore piece relative to the underlying first layer gore piece.

In another approach for disposing the gore pieces to form the gore body, the gore pieces of a given gore piece layer are overlapped. For example, the gore body may comprise a first layer of gore pieces disposed around the doubly curved surface, and sequential ones of the first layer gore pieces overlap one another. In presently preferred embodiments and methods, each of the first layer gore pieces overlaps an adjacent first layer gore piece by about 40 to 60%, and more preferably by about 50%.

Figure 7:
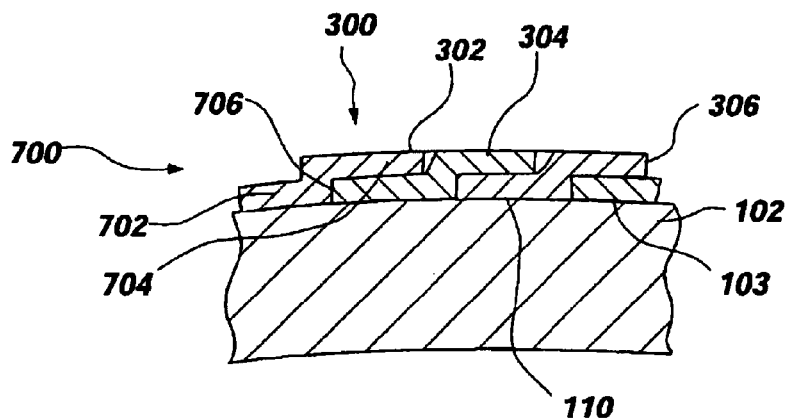
FIG. 7 shows a cutaway longitudinal midsectional view of the vessel shown in FIG. 1 and illustrates a second approach to positioning the gore pieces on the vessel body to make up the gore body.

An illustrative example of this approach is shown in FIG. 7. A first layer 700 of gore pieces, comprising sequential gore pieces 302, 304, and 306, is disposed on vessel body 102 at doubly curved surface 110, completely surrounding doubly curved surface 110. As exemplified by gore piece 302, each of the gore pieces of first layer 700 is disposed essentially in a flattened "Z" configuration wherein a first portion 702 thereof resides at a first level contacting vessel body outer surface 103 and a second portion 704 thereof is folded over a meridional edge, e.g., edge 706 of gore piece 304. As with gore piece 302, each gore piece then rises to the radially outward surface of the adjacent gore piece, here gore piece 304. This flattened "Z" pattern is repeated with the sequential gore pieces of first layer 700 around the entire doubly curved surface 110. The overlap of each gore piece with respect to the adjacent and underlying gore piece, e.g., of gore piece 302 with respect to underlying piece 304, preferably is about 40 to 60% and, more preferably, as shown in FIG. 7, is about 50%. In the latter instance, the meridional edge (e.g., edge 706) of each underlying gore piece is essentially centered under the overlying gore piece.

This "Z" first layer 700 may be used alone to form gore body 300, or it may be used in conjunction with other or additional gore piece layers to form the gore body. The additional layers may comprise another layer configured as in first layer 700, may be configured as one or both of the layers 600 and 610 of FIG. 6, or may have other configurations. It will be appreciated that the configurations of gore pieces as shown and described with respect to FIGS. 6 and 7, although being preferred examples, are merely illustrative of this aspect of the invention, and other configurations or combinations of configurations of the gore pieces to form the gore body may be used.

In describing the application and configuration of the gore body hereinabove, attention has been focused on the gore body at forward end 108 of vessel body 102. It will be appreciated, however, that the same design and implementation, or any of the designs and implementations discussed above, may be made at aft end 114 of the cylindrical section 104 of vessel body 102.

Regardless of the approach used in disposing the gore pieces to form the gore body or bodies, it is generally preferable that they be disposed so that the gore body has a substantially uniform thickness.

It may be desirable in a given application to further secure the gore body to the vessel body. This may be done in a number of ways. For example, a set of hoop windings 200, 202 (see FIG. 2) may be used at the peripheral portion of the gore body and around the forward and/or aft ends of cylindrical section 104, or both, to secure the gore body to the vessel body. Such securing means are not necessarily desirable in all applications, but, where appropriate, can prevent dislocation or failure of the reinforcing structure.

It is desirable in many applications to specifically orient the longitudinal axis or dimension 402 of the individual gore pieces relative to the vessel longitudinal axis 105 so that each of the gore pieces has an offset angle β with respect to these two dimensions. Although a number of angular configurations may be used, a preferred range for the offset angle β is between about +15° and −15°, and preferably the offset angle β should be a maximum of about 20°.

Figure 8:
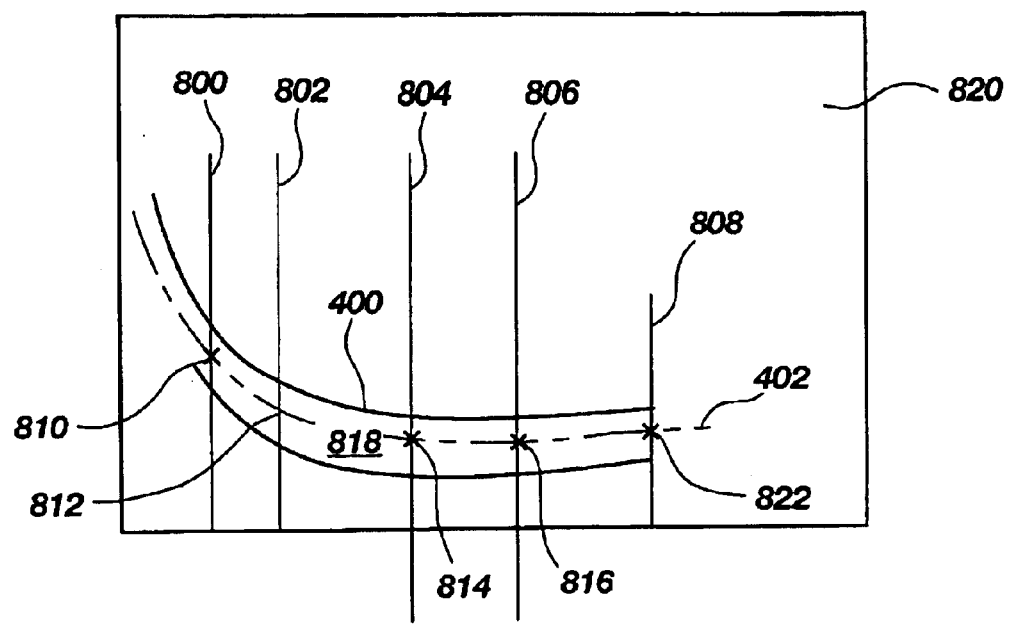
FIG. 8 shows an isolated one of the gore pieces removed from the gore body of FIG. 3 to include imaginary geometric features or mathematical constructions including a line of alignment, a gore piece longitudinal axis, tangents, and a perpendicular plane, wherein these imaginary features are useful in defining an orientation of the gore piece relative to an axis of symmetry in the gore body.
Figure 9:
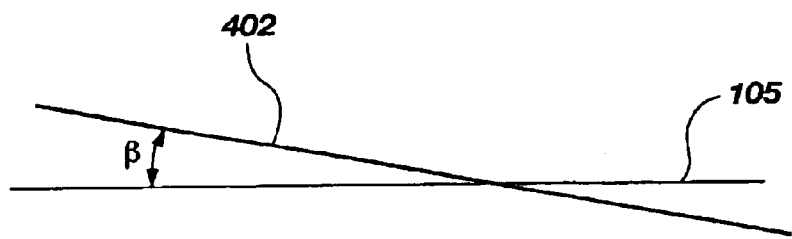
FIG. 9 depicts the perpendicular plane of FIG. 8 rotated for viewing as a straight line having an angular orientation relative to the axis of symmetry in the gore body.

To illustrate the offset that may be used, as shown in FIG. 8, each of the gore pieces (e.g., gore piece 400) may have an offset angle relative to the vessel longitudinal axis 105 such that a plurality of tangents 800, 802, 804, 806, and 808 taken at points 810, 812, 814, 816 and 822 on the longitudinal dimension 402 and normal to surface 818 defines a curved perpendicular plane 820 relative to the plurality of tangents, wherein the perpendicular plane 820 may be for viewing the longitudinal dimension 402 as a straight line from a perspective that is normal to any one of the tangents 800–808. When the perspective is so rotated, as shown in FIG. 9, the longitudinal dimension 402 is offset from the vessel longitudinal axis 105 by the angle β, as described above.

It is an especially preferred aspect that the orientations of any of the angles β, λ, and θ can be adjusted individually or in combination to place the fibers 136 (see FIG. 1) in substantially parallel alignment with the fibers 404 and 406 of the gore pieces. Where this alignment of fibers is not in parallel, it is presently preferred that the angular orientation alignment of the gore piece fibers, e.g., fibers 404 and 406, relative to vessel longitudinal axis 105 is at least 60% of the angle θ.

Placement of the gore pieces upon the pressure vessel may be done by hand, or a conventional bulk axis fiber placement machine, e.g., a machine having an ability to move among five axes of orientation, may be used to place the gore pieces.

Figure 10:
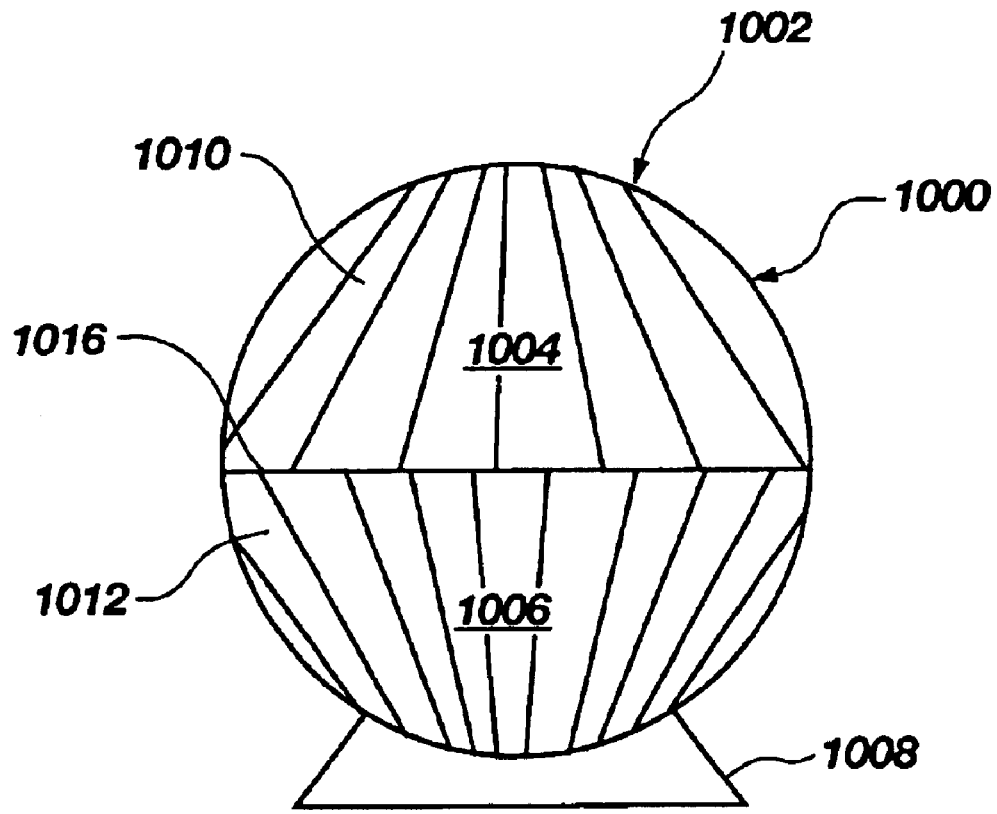
FIG. 10 shows a substantially spherical vessel with attached gore body according to another preferred embodiment of the invention.

The specific shape of the vessel to which the invention may pertain is not necessarily limited to those shown in the drawings and described above. The vessel, for example, may be spherical, such as the illustrative vernier motor 1000 shown in FIG. 10. Motor 1000 includes a doubly curved outer spherical surface 1002 including a top hemispherical pressure reinforcement dome 1004 and a bottom dome 1006 coupled with an exit cone reinforcing structure 1008. Each of the domes 1004 and 1006 is formed of a plurality of assembled gore pieces, e.g., gore pieces 1010 and 1012 in the manner described above; however, the corresponding end portions either abut or, more preferably, overlap for additional strength in the region of line 1016.

Figure 5:
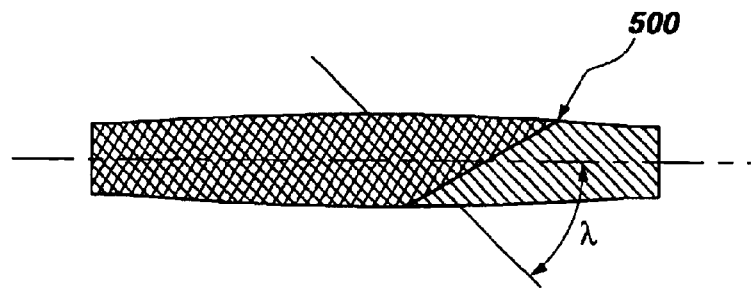
FIG. 5 shows a gore piece according to the preferred embodiment shown in FIG. 1, wherein the gore piece has a rhombic shape.

FIG. 5 depicts a dual-tapering gore piece 500 that can be used on a spherical vessel 1000 in place of the combined gore pieces 1010 and 1012. The use of gore piece 500 eliminates line 1016 and provides additional strength.

Additional advantages and modifications will readily occur to those skilled in the art. For example, the gore bodies shown as domes 106, 112, 1004, and 1006 may be covered with successive layers of fiber or tow, such as the fibers 136 that constitute outer surface 103 as shown in FIG. 1. Alternatively, the gore bodies shown as domes 106, 112, 300, 1004, and 1006 may be constructed on a separate support or mandrel and removed, perhaps in a frozen state, for subsequent thawing and tackified placement upon a pressure vessel body 102. Furthermore, the gore pieces need not necessarily be impregnated with a resin prior to assembly on the pressure vessel because it is also possible to use tackified strips containing an adhesive, e.g., the FIBERITE® materials that can be purchased from Cytec Fiberite, that melts upon oven curing of the entire pressure vessel, thus integrally forming the gore body with the pressure vessel.

Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A vessel comprising:
   a vessel body having at least one surface which is curved about both a vessel body axis and a second axis; and
   a reinforcing structure disposed at the at least one surface of the vessel body and about the vessel body axis, the reinforcing structure comprising a plurality of gore pieces disposed on the vessel body at the at least one surface of the vessel body to form a gore body, each gore piece comprising a composite sheet having a shape that conforms to the at least one surface of the vessel body, the gore pieces being disposed on the at least one surface of the vessel body in overlapping relation, wherein the gore body comprises:
      a first layer of gore pieces substantially abutting one another around the at least one surface of the vessel body; and
      and a second layer of gore pieces disposed over the first layer of gore pieces and around the at least one surface of the vessel body so that each of the gore pieces of the second layer overlaps at least two of the gore pieces of the first layer.

2. A method for reinforcing a vessel having a vessel body with at least one surface which is curved about both a vessel body longitudinal axis and a second axis, the method comprising:
   providing a plurality of gore pieces, each of the gore pieces comprising a composite sheet; and
   disposing the plurality of gore pieces on the vessel body at the at least one surface of the vessel body and about the longitudinal axis to form a gore body, including shaping each gore piece to conform to the at least one surface of the vessel body in an overlapping relation, wherein disposing the plurality of gore pieces further includes disposing the gore pieces on the at least one surface of the vessel body in first and second layers so that the first layer of gore pieces substantially abut one another around the at least one surface of the vessel body and the second layer of gore pieces is disposed over the first layer of gore pieces and around the at least one surface of the vessel body so that each gore piece of the second layer overlaps at least two gore pieces of the first layer.

3. A vessel comprising:
   a vessel body having at least one surface which is curved about both a vessel body axis and a second axis; and
   a reinforcing structure comprising a plurality of gore pieces, each gore piece comprising a sheet of composite material including a first surface, a second opposing surface and a plurality of fibers extending substantially parallel to the first surface, each gore piece exhibiting a first width at a first longitudinal location along a length of each gore piece and a second lesser width at a second longitudinal location along the length of each gore piece, wherein the first longitudinal location of each gore piece is disposed at a first radial distance from the vessel body axis, the second longitudinal location of each gore piece is disposed at a second lesser distance from the vessel body axis, and wherein at least a portion of the first surface of each gore piece is disposed over and conforms to at least a portion of the at least one surface of the vessel body and wherein the plurality of gore pieces is configured as a first layer of gore pieces substantially abutting one another around the at least one surface of the vessel body, and a second layer of gore pieces disposed over the first layer of gore pieces and around the at least one surface of the vessel body so that each of the gore pieces of the second layer overlaps at least two of the gore pieces of the first layer.

4. The vessel as set forth in claim 3, wherein each gore piece includes a meridional edge, and wherein each gore piece of the first layer abuts an adjacent gore piece of the first layer along their respective meridional edges.

5. The vessel as recited in claim 3, wherein each gore piece of the second layer overlaps the at least two gore pieces of the first layer by about 40 to 60%.

6. The vessel as set forth in claim 3, wherein each gore piece of the second layer overlaps the at least two gore pieces of the first layer by about 50%.

7. A method for reinforcing a vessel having a vessel body with at least one surface which is curved about both a vessel body and a second axis, the method comprising:
   providing a plurality of gore pieces, each gore piece comprising a sheet of composite material having a first surface, a second opposing surface and a plurality of fibers extending substantially parallel to the first surface, each gore piece exhibiting a first width at a first longitudinal location along a length of each gore piece and a second lesser width at a second longitudinal location along the length of each gore piece, wherein providing a plurality of gore pieces further includes:
      forming a first layer of gore pieces which substantially abut one another around the at least one surface of the vessel body; and
      forming a second layer of gore pieces disposed over the first layer of gore pieces so that each gore piece of the second layer overlaps at least two gore pieces of the first layer;

forming a gore body including disposing the plurality of gore pieces on the vessel body at the at least one surface of the vessel body such that the first longitudinal location of each gore piece is disposed at a first distance from the vessel body axis and the second longitudinal location of each gore piece is disposed at a lesser second distance from the vessel body axis and such that at least a portion of the first surface of each gore piece is configured to be disposed upon and conform to at least a portion of the at least one surface of the vessel body; and overlapping a portion of at least one of the plurality of gore pieces with a portion of at least one other of the plurality of gore pieces.

8. The method as set forth in claim 7, wherein each gore piece includes a meridional edge and wherein forming a first layer of gore pieces includes abutting adjacent gore pieces of the first layer to one another along their respective meridional edges.

9. The method as recited in claim 7, wherein forming the second layer of gore pieces includes positioning each gore piece of the second layer to overlap each of the at least two gore pieces of the first layer by about 40 to 60%.

10. The method as recited in claim 7, wherein forming the second layer of gore pieces includes positioning each gore piece of the second layer to overlap each of the at least two gore pieces of the first layer by about 50%.

* * * * *

UNITED STATES PATENT AND TRADEMARK OFFICE
CERTIFICATE OF CORRECTION

PATENT NO.     : 6,719,165 B2
DATED          : April 13, 2004
INVENTOR(S)    : Roger D. Wright et al.

It is certified that error appears in the above-identified patent and that said Letters Patent is hereby corrected as shown below:

Column 1,
Line 16, change "OF4611-97-C-0053" to -- FO4611-97-C-0053 --

Column 6,
Line 16, change "the '262 Patent"" to -- the '"262 Patent" --

Column 11,
Line 11, change "spherical vessel 1000" to -- "vernier motor 1000" -- as per element numbering key and other references in patent Signed and Sealed this Twenty-second Day of February, 2005

JON W. DUDAS
*Director of the United States Patent and Trademark Office*